United States Patent
Cheng et al.

(10) Patent No.: US 7,669,021 B2
(45) Date of Patent: Feb. 23, 2010

(54) FILE SYSTEM BASED OFFLINE DISK MANAGEMENT

(75) Inventors: Haichen Cheng, Sammamish, WA (US); Sudhagar Thirumoolan, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 432 days.

(21) Appl. No.: 11/358,327

(22) Filed: Feb. 21, 2006

(65) Prior Publication Data

US 2007/0226436 A1 Sep. 27, 2007

(51) Int. Cl.
*G06F 12/00* (2006.01)
*G06F 13/00* (2006.01)
*G06F 13/28* (2006.01)

(52) U.S. Cl. ............... 711/162; 711/173; 707/204
(58) Field of Classification Search ............ 711/162
See application file for complete search history.

(56) References Cited

U.S. PATENT DOCUMENTS

| | | | |
|---|---|---|---|
| 6,615,365 B1 * | 9/2003 | Jenevein et al. | 714/6 |
| 6,795,966 B1 * | 9/2004 | Lim et al. | 718/1 |
| 7,007,077 B1 * | 2/2006 | Shinohara et al. | 709/220 |
| 2001/0047451 A1 * | 11/2001 | Noble et al. | 711/111 |
| 2003/0074535 A1 * | 4/2003 | Owhadi | 711/162 |
| 2004/0003103 A1 * | 1/2004 | Witt et al. | 709/231 |
| 2006/0074943 A1 * | 4/2006 | Nakano et al. | 707/100 |
| 2007/0180206 A1 * | 8/2007 | Craft et al. | 711/162 |

OTHER PUBLICATIONS

Preboot Execution Environment (PXE) Specification Version 2.1; Sep. 20, 1999; Intel Corporation.*
Winder, "Acronis True Image 9," PCPro Product Reviews, printed from http://www.pcpro.c.uk/security/reviews/81427/acronis-true-image-9.html, Feb. 2006, 3 pages, Issue 136, Dennis Publishing Limited, United Kingdom.
Winder, "Symantec Norton Ghost 10," PCPro Product Reviews, printed from http://www.pcpro.co.uk/security/reviews/81428/symantec-norton-chost-10.html, Feb. 2006, 3 pages, Issue 136, Dennis Publishing Limited, United Kingdom.
Unknown, "Minuteman RPM—Remote Power Manager," Product Description, 2001, 3 pages, Para Systems, Inc., U.S.A.

* cited by examiner

*Primary Examiner*—Brian R Peugh
*Assistant Examiner*—Prasith Thammavong
(74) *Attorney, Agent, or Firm*—Senniger Powers LLP

(57) ABSTRACT

Logically imaging a memory area or a portion thereof while the memory area is offline. For each partition of a selected volume of the memory area, the logical files are captured along with volume and partition information and stored in an image file to enable logical restoration of the captured image.

15 Claims, 5 Drawing Sheets

FILE SYSTEM BASED OFFLINE DISK MANAGEMENT

BACKGROUND

Disk imaging is widely used to backup and restore data on computer storage media. Disk imaging, as known in the art, captures a snapshot of the data on a computer hard disk. The captured image may be used subsequently to re-create the disk. Existing disk imaging solutions are sector based. That is, these solutions copy the disk physical data as it is laid out on the hard disk sector by sector, in raw binary format, regardless of whether the data is useful or not (e.g., even empty space is captured). Further, files that should not be captured, such as page files, are also captured resulting in large image files that inefficiently use storage resources. Existing systems that store the large image files on storage resources accessible over a network also inefficiently use network resources.

Existing file backup solutions save the logical content of the file system in online mode (e.g., while executing an operating system stored at least in part on the file system). However, files such as some subset of operating system files cannot be captured while the file system is online. Further, the existing file backup solutions do not preserve information relating to the disk partition, boot sector, and the like. As such, the existing file backup solutions cannot restore an entire disk to a prior state.

Defragmentation tools, as known in the art, move file segments around on a disk to minimize the physical separation of logically continuous file segments. Existing defragmentation tools operating on a file system execute in online mode (e.g., while an operating system stored at least in part on the file system is being executed). As such, the existing defragmentation tools are limited at least in that critical file system data and files locked by the executing operating system cannot be defragmented. Further, if the disk is mostly full, the defragmentation process requires a significant amount of time to complete.

SUMMARY

Embodiments of the invention capture and restore one or more logical volumes of data on computer readable media. In an embodiment, the invention images the volumes while the volumes are offline to include files associated with an operating system stored on the volumes. Aspects of the invention further capture volume and partition information regarding the physical layout of the volumes such that the volumes may be restored to a state that is logically equivalent to a prior state. Further, the system supports capture of selected data. The system also enables efficient and effective defragmentation of the volumes.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
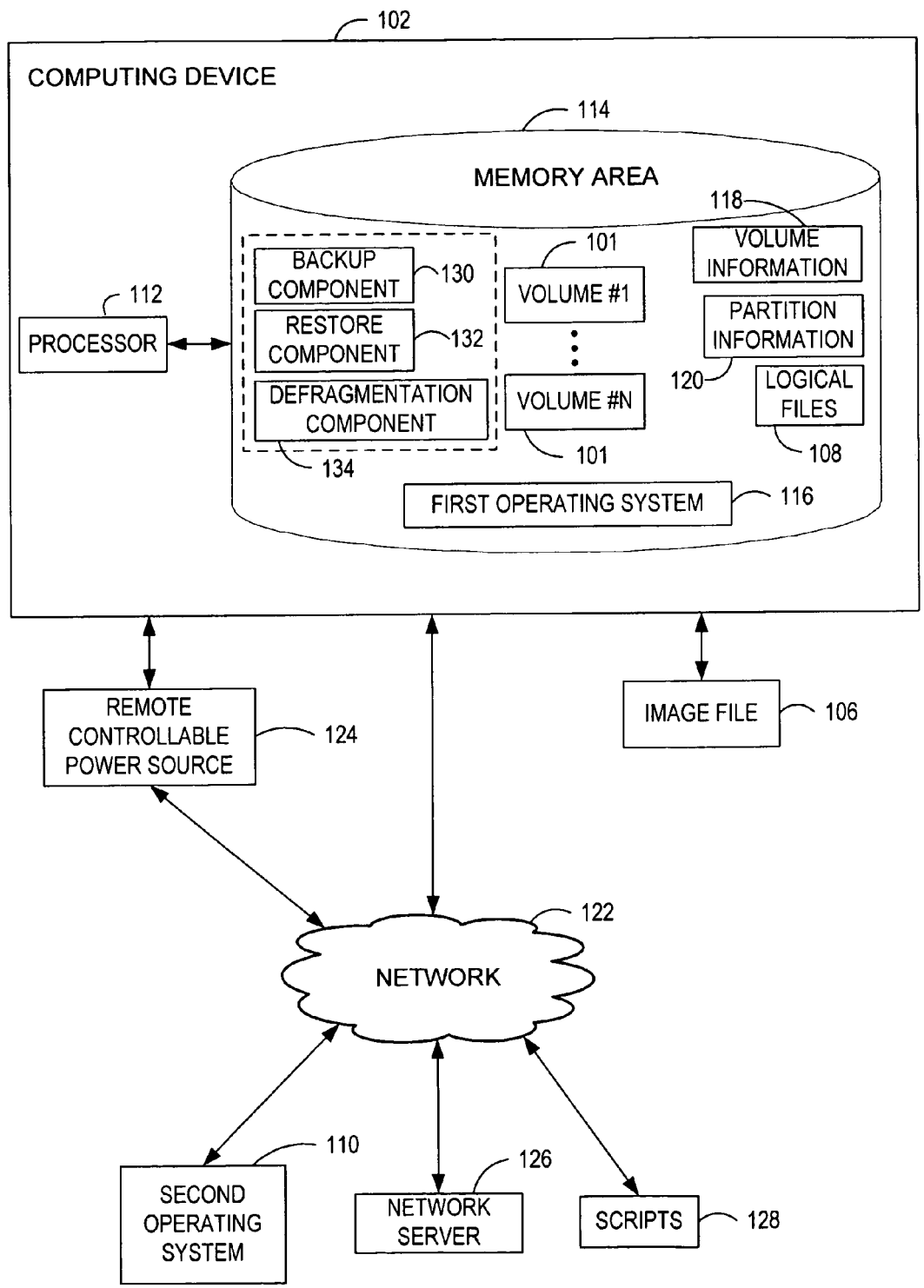
FIG. 1 is an exemplary embodiment of a suitable computing system environment in which aspects of the invention may be implemented.

In an embodiment, the invention includes the logical capture and restoration of data in at least one volume 101 on one or more computer storage media such as shown in FIG. 1. In particular, a computing device 102 images the logical contents of the volume 101, rather than imaging the volume 101 on a sector-by-sector basis. Logical-based capture is also known as volume-based capture, file-based capture, or the like. The captured image (e.g., image file 106) enables the volume 101 to be restored to a state that is logically equivalent to a prior state. The captured image file 106 includes all the files (e.g., logical files 108) on the volume 101 to provide a full backup, or a subset of the logical files 108 (e.g., only modified files, or only files selected by a user) to provide an incremental backup. In addition, the imaging process of an embodiment of the invention occurs while the volume 101 is offline (e.g., the computing device 102 is executing an operating system such as a second operating system 110 not associated with the volume 101) thus enabling the capture of files 108 that are typically locked when the volume 101 is online. In another embodiment, the invention operates to defragment the media in an effective and efficient manner.

Figure 2:
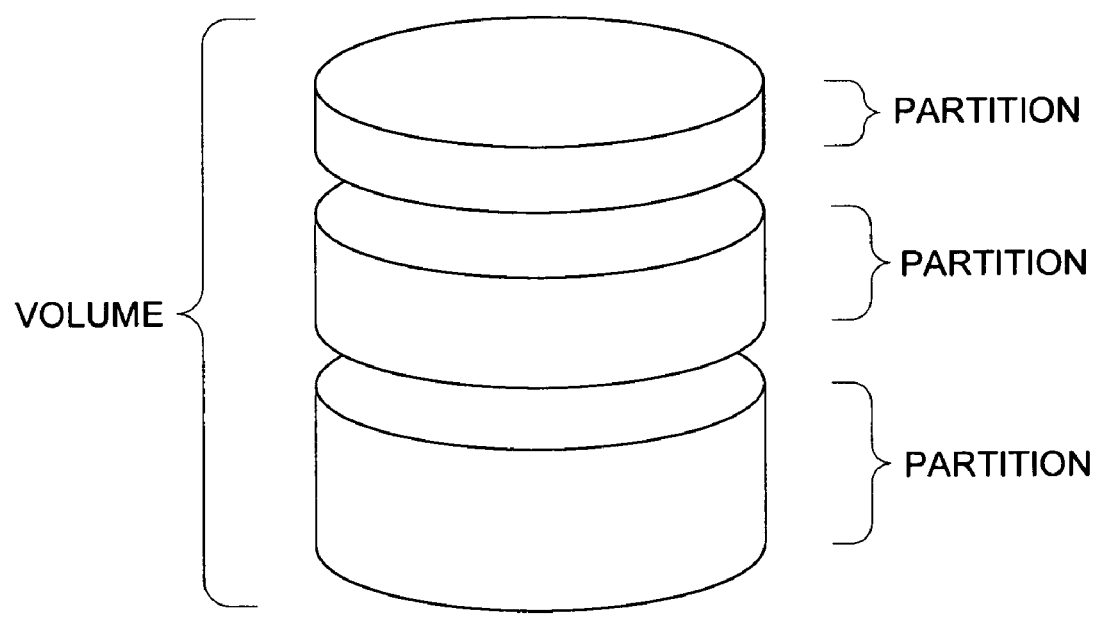
FIG. 2 is an exemplary block diagram illustrating a volume spanning multiple partitions.

Referring again to FIG. 1, a block diagram illustrates an exemplary embodiment of a suitable computing system environment in which aspects of the invention may be implemented. The system in FIG. 1 includes the computing device 102 having a processor 112 and memory area 114 associated therewith. The memory area 114 is comprised of one or more computer-readable media such as hard disks. While the memory area 114 is shown to be a part of the computing device 102 in one embodiment, other embodiments contemplate that the memory area 114 is accessible to the computing device 102 (e.g., via a network). The memory area 114 stores logical volumes 101, as known in the art, such as volume #1 through volume #N. As illustrated in FIG. 2, each of the volumes 101 spans one or more partitions of a computer-readable medium. The memory area 114 further stores the logical files 108. While the volumes 101 and logical files 108 are shown to be separate entities in FIG. 1 for ease of illustration, the logical files 108 are actually associated with one or more of the volumes 101. Further, some of the logical files 108 comprise a first operating system 116. The memory area 114 further stores volume information 118 and partition information 120.

The computing device 102 is connected to a network 122 and a programmatically remote controllable power source 124, outlet, or the like. Via the network 122, the computing device 102 has access to the second operating system 110, a network server 126, and one or more scripts 128 (e.g., a capture script and an apply script).

In one embodiment, the memory area 114 stores one or more computer-readable media having computer-executable components. The processor 112 is configured to execute the computer-executable components. Exemplary components include a backup component 130, a restore component 132, and a defragmentation component 134. The backup component 130 boots the computing device 102 into an operating system (e.g., a second operating system) such as a reduced operating system available over the network 122. The operating system may also be a full featured operating system that is the same as, similar to, or completely different from the first operating system. Booting from a reduced operating system enables fast network boot times. Performing such a network boot allows the backup component 130 to operate on the volume 101 while the volume 101 is in offline mode. The backup component 130 identifies one or more volumes 101 of the memory area 114 each spanning one or more partitions. For each of the partitions, the backup component 130 copies the logical files 108 associated with the partition from the memory area 114 to an image file 106 accessible by the computing device 102. For example, the image file 106 may be associated with the memory area 114, local to the computing device 102 (as shown in FIG. 1), or remote from the computing device 102 (e.g., accessible via the network 122). The backup component 130 further obtains the volume information 118 and partition information 120 for the partition from the memory area 114 and stores this information in the image file 106.

The restore component 132 accesses the image file 106 to identify the volumes stored in the accessed image file 106 and the partitions associated with the identified volumes. For each of the identified partitions, the restore component 132 obtains the volume information 118 and partition information 120 for the partition. The restore component 132 further configures the disk associated with the computing device 102 based on the obtained volume and partition information 118, 120 and extracts the logical files associated with each of the identified partitions to the disk to restore the identified volumes.

The defragmentation component 134 operates to defragment the volume 101. Each of the logical files 108 comprises one or more segments. The defragmentation component 134 writes the segments of each of the logical files from the image file 106 to contiguous sectors on the disk to increase the speed of access and retrieval.

The dashed line around the backup component 130, the restore component 132, and the defragmentation component 134 in FIG. 1 indicate that these three components may optionally be part of a single utility or tool. Such an embodiment enables functionality including, for example, imaging the entire disk while only restoring a subset of files; and re-imaging, restoring, and defragmenting from (or sharing) the same disk imaging file.

Figure 3:
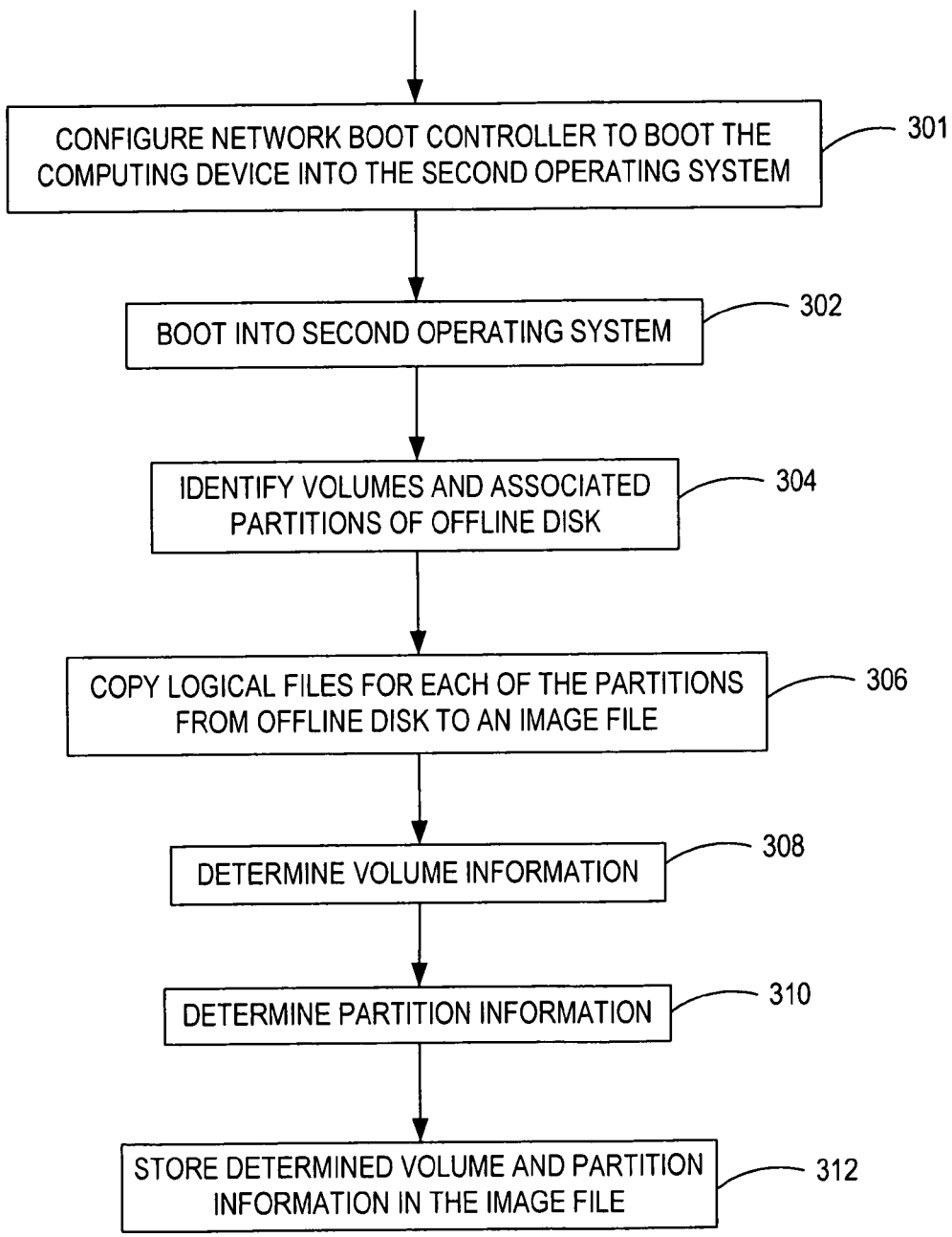
FIG. 3 is an exemplary flow chart illustrating operation of the disk imaging process.

Referring next to FIG. 3, an exemplary flow chart illustrates operation of the disk imaging process. In general, the flow chart in FIG. 3 illustrates the capture of the logical files and physical layout information associated with one or more volumes, as predefined or selected by a user. The captured files and physical layout information are stored, for example, in an image file that may be later used to restore the captured volumes (see FIG. 4). In an alternative embodiment, the method illustrated in FIG. 3 may be used to selectively capture files and the associated physical layout information, even if the files are stored in different partitions or volumes. In such an example, the selected files represent a subset of the files stored on the disk.

In FIG. 3, the method includes configuring a network boot controller at 301 to make the computing device to boot into an operating system (e.g., a second operating system or a remote operating system). The method boots into the second operating system at 302 such that the volumes of the local disk are in offline mode. A first or local operating system is offline in that no files associated therewith are executed during the method. In this manner, files on the volumes that would normally be locked during execution are available for imaging. The files used by the second operating system may be remote (e.g., residing on another computing device over a network), external (e.g., an external hard disk), removable (e.g., on compact disc, digital versatile disc, floppy disk, or flash memory), and/or internal (e.g., on another hard disk, on the same hard disk but in a different partition, or on the same hard disk and same partition but with a different root directory).

For example, if the computing device has a first operating system (e.g., first operating system 116 in FIG. 1) associated therewith, the method boots the computing device into a second operating system (e.g., second operating system 110 in FIG. 1) that is not associated with the first operating system. As such, the method is able to copy the logical files associated with the first operating system, which files would be locked or otherwise inaccessible if the first operating system was being executed. For example, the computing device may boot from an operating system stored on a compact disc inserted into a compact-disc reader accessible by the computing device.

The method further identifies the volumes and associated partitions of the offline disk to be imaged at 304. For each of the partitions, the method copies the logical files associated with the partition to an image file at 306, determines volume information at 308 and partition information at 310 for the partition, and stores the determined volume and partition information in the image file at 312. In one embodiment, the volume information and partition information are stored as separate images in the image file. In another embodiment, the volume information and partition information are stored as one of the logical files captured to the image file.

The partition information includes, but is not limited to, one or more of the following: partition type, partition size, partition offset, hidden status (e.g., hidden or not), active status (e.g., active or not), and boot sector information. The boot sector information comprises all of the boot sector content captured as a binary file, or a subset of the content sufficient to recreate to the boot sector on each partition (e.g., which type of boot sector, what is the loader file name, etc.).

There is also information about the volume on each partition. The volume information includes, but is not limited to, one or more of the following: volume identifier, drive letter, label, file system, volume type, volume size, and volume status, among other information.

Figure 4:
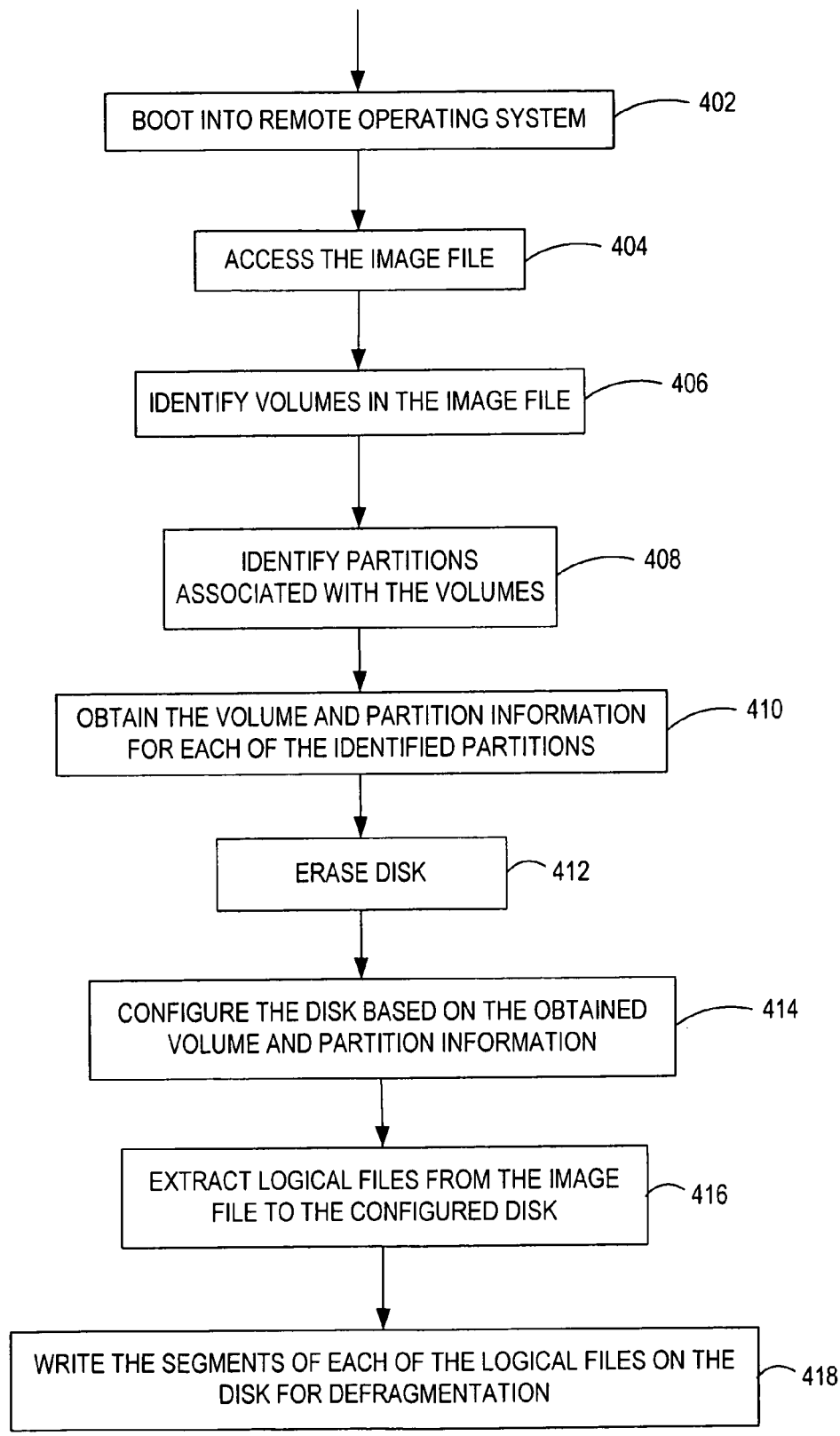
FIG. 4 is an exemplary flow chart illustrating application of a disk image to a computer storage medium.

Referring next to FIG. 4, an exemplary flow chart illustrates application of a disk image to a computer storage medium. In general, the method treats the image file as an offline data file. The method boots the computing device into an operating system (e.g., as in the description of FIG. 3) at 402 and accesses the image file at 404. The method identifies one or more volumes stored in the accessed image file at 406 and identifies the partitions associated with the identified volumes at 408. For each of the identified partitions, the method obtains the volume information and partition information at 410. In one embodiment, the method erases the disk at 412 to prepare the disk to be reconfigured. In other embodiments (e.g., those in which only a portion of the disk are to be reconfigured), the method does not erase the disk. At 414, the method configures the disk associated with the computing device based on the obtained volume information and the obtained partition information. For example, the method re-formats and/or re-partitions to the disk according to the number, size, and type of partitions and volumes indicated in the image file. The method extracts the logical files associated with each of the identified partitions from the image file to the disk to restore the identified volumes at 416.

In one embodiment, the method includes receiving a selection of the logical files from a user. The received selection of the logical files represents a subset of the logical files. In this embodiment, the method only extracts the selected subset of the logical files to the disk to restore the identified volumes. Further, the extracted subset of the logical files may be stored anywhere on the disk (e.g., in the same or different logical location from where the subset of logical files were captured, such as to a different logical drive or directory). For example, files originally in drive C: may be restored to drive D:, while files originally under c:\xyz may be restored to c:\abc, d:\xyz, d:\abc, or d:\cde\fgh\.

The offline capture and apply process (e.g., as illustrated in FIG. 3 and FIG. 4) may be performed without booting the computing device itself in one embodiment. Rather, another computing device may access the memory area while the computer device itself is not booted.

In a defragmentation embodiment, the method writes the segments of each of the logical on the disk to effect defragmentation at 416. Defragmentation, as known in the art, is the process of rewriting segments of a file to contiguous sectors on the disk to increase the speed of access and retrieval. When files are updated, the computing device tends to save these updates on the largest continuous space on the disk, which may be in a different sector than the other segments of the file. When files are thus "fragmented," the computing device searches the disk each time the file is accessed to find all of the file's segments, which slows down response time.

When there are large, contiguous, empty spaces in a file system, the file system allocates contiguous sectors for new files. Aspects of the invention create large, contiguous, empty spaces by formatting the disk, or deleting a plurality of files. Writing the files back one by one automatically places them into the resulting contiguous sectors.

The offline defragmentation aspect of the invention stores the files in a more optimal manner than typical online defragmentation solutions. That is, the files are stored proximal to each other with minimal space between each of the files. Typical defragmentation systems operate on the disk while the disk is online (e.g., certain files are being executed), which prevents complete defragmentation of the disk. The offline defragmentation aspect of the invention is operable with the volume-based imaging solutions described herein or existing sector-by-sector imaging solutions.

In one defragmentation example, the method removes a user-selected subset of content for each partition from the disk (e.g., delete folders, partitions, or the whole disk). The method then recreates each partition (e.g., recreate the folders, reformat the partitions with the saved volume information, or recreate the partitions and format them with the save volume information). The image is applied to the recreated partitions.

Figure 5:
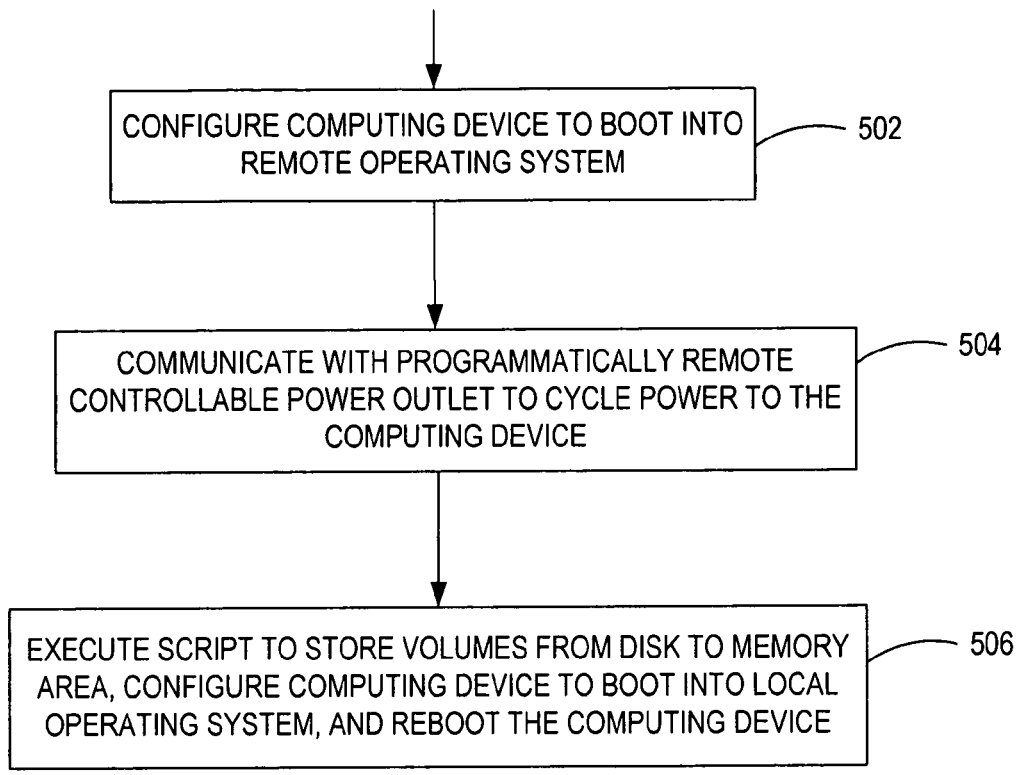
FIG. 5 is an exemplary flow chart illustrating remote controlled installation of software using a programmatically remote controllable power source.

Referring next to FIG. 5, an exemplary flow chart illustrates remote controlled management of software using a programmatically remote controllable power source. The image capture and apply method described with reference to FIG. 5 in part is not limited to the volume-based methods described above (e.g., with reference to FIG. 3 and FIG. 4). In one example, aspects of the inventions are operable with the programmatically remote controllable power sources such as the Minuteman series of remote power managers from Para Systems of Carrollton, Tex. In general, the remote controllable power source includes a networked power strip that is capable of cycling power to each of its outlets independently to effect a reboot of the connected computing devices. The networked power strip has an Internet Protocol (IP) address associated therewith to allow a networked computing device to send program commands to the power strip (e.g., power on a particular outlet, power off a particular outlet) via network protocols such as the hypertext transfer protocol, the file transfer protocol, the simple mail transport protocol, the simple network management protocol, and the telnet protocol.

In the example of FIG. 5, the method provides for automated capture of the contents of selected volumes of a disk. The method associates a first operating system with a computing device. The method configures the computing device at 502 to boot into a second operating system (e.g., a network boot into the second operating system of FIG. 1) and to execute a capture script. The computing device is operatively connected to a programmatically remote controllable power source. The method communicates with the programmatically remote controllable power source to reboot the computing device into the second operating system at 504. As configured at 502, the second operating system executes the capture script at 506 to store the contents of one or more volumes of a first memory area to a second memory area (e.g., store the volumes to a network device, local disk, or other volume on the first memory area). In one embodiment, the contents include data associated with the first operating system. The second operating system further executes the capture script to configure the network boot controller to make the computing device to boot into its first operating system (e.g., a local operating system) on the next boot. The capture script then reboots the computing device into the first operating system (e.g., without the aid of the remote controllable power source). The stored data in the second memory area represents a snapshot of the selected data from the first memory area.

The method also provides for automated installation of the captured image to a disk. The method configures the computing device to boot into the second operating system and to execute an apply script. The method includes another computing device communicating with the programmatically remote controllable power source to reboot the computing device into the second operating system. This other computing device may be the same or different from a computing device associated with the network boot controller. The second operating system executes the apply script to apply the contents of the one or more volumes stored in the second memory area to the first memory area. Execution of the apply script further configures the computing device to reboot into the first operating system on the next boot. The apply script further operates to reboot the computing device into the first operating system (e.g., without the aid of the remote controllable power source).

The methods illustrated and described herein may be used to capture and store the contents of one partition of a disk to another partition of the same disk. Further, the method may be performed without any human intervention local to the computing device. In such an embodiment, the methods may be described as "hands-free."

In one embodiment, the invention is operable with the implementation of Pre-Install Execution Environment (PXE) protocol from Microsoft Corporation, for example, in the Remote Installation Service or Windows Deployment Service of Microsoft Corporation. However, aspects of the invention are not limited to the PXE protocol. The PXE server is programmatically configured for the computing device upon its next boot. In particular, the network boot loader of the computing device is configured. An offline network boot operating system image is specified for the next boot.

Although nearly any operating system image will work in this example, it is desirable to use an OS image that is relatively small and can execute the function of capture and restore image. Suitable operating system images include, but are not limited to, the disk operating system (DOS) or small-sized variations of Linux. The suitable operating system images also include supporting binaries and data files to be used in the capture operation of aspects of the invention.

After being rebooted into the suitable operating system image and executing the capture script, the PXE server is programmatically configured to change the setup options for the computing device upon its next reboot. For example, the PXE server may be configured to disable a network boot upon the next boot to allow the computing device to boot into a local operating system.

The automated software management aspects of the invention as described and/or illustrated with reference to FIG. 5 in part support a variety of scenarios. For example, a full disk image or partial disk image (e.g., selected partitions) may be captured to a local or remote disk and restored. The image may be stored to another disk or another part of the same disk such as another partition, another folder, or another file. The image may be restored to the same logical location from which it was captured. In another example, the image may be restored to a similar directory structure but under a different logical drive or parent directory. In yet another example, specified files may be captured and saved to a network storage medium or a local storage medium, then applied back to their original locations or different locations. In a defragmentation example, a target representing the entire disk or portions thereof (e.g., selected partitions, folders, or files) may be captured and saved to a network storage medium or a local storage medium. The original target location is erased, reformatted, and/or repartitioned as appropriate prior to restoring the captured data to the target location in an optimal manner.

Further, the methods illustrated in the figures may be used to capture and restore different images of the same computing device using a central controlling computing device. The central controlling computing device programmatically decides when to capture and apply an image and which image to apply. The central controlling computing device further controls the remote boot controller and the remote controllable power switch to boot the computing device into different operating system images. As such, complex processes such as automated testing, and desktop software configuration management solutions may be automated. In addition, multiple such complex processes may execute on different computing devices in parallel with little or no intervention among those different computing devices. In one embodiment, all parts of the central controlling solution run on one central computing device. In another embodiment, different parts of the central controlling solution run on different computing devices but each part only runs on one device. In yet another embodiment, multiple computing devices execute the solution co-operatively (e.g., each part may be distributed to one of a plurality of computing devices).

In one embodiment, one or more computer-readable media have computer-executable instructions for performing the methods illustrated in FIG. 3, FIG. 4, and FIG. 5.

The exemplary operating environments illustrated in the figures include a general purpose computing device such as a computer executing computer-executable instructions. The computing device typically has at least some form of computer readable media. Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. The computing device may operate in a networked environment using logical connections to one or more remote computers.

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, game consoles, personal media players, digital cameras, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

Aspects of the invention may also be practiced in distributed computing environments where tasks are performed by remote processing devices that are linked through a communications network. In a distributed computing environment, program modules may be located in both local and remote computer storage media including memory storage devices.

In operation, a computer executes computer-executable instructions such as those illustrated in the figures to implement aspects of the invention. Further, hardware, software, firmware, computer-executable components, computer-executable instructions, and/or the elements of the figures constitute means for implementing the methods illustrated in the figures and described herein.

The following examples further illustrate aspects of the invention. In a software testing scenario, developers often boot a test machine into a known, safe software testing environment. When a test fails, the test environment may become corrupted and need to be restored. With aspects of the invention, the test environment (e.g., an operating system image or an image of application and data files) may be captured to a network share prior to testing of the software under development to create a starting point for the software testing. The imaged data may represent the entire disk or portion thereof. To reduce bandwidth during testing, the image (which may be several gigabytes in size) may be saved locally (e.g., from partition 1 to partition 3). If the software being tested includes only application files and data (e.g., no operating system files or data), the imaged data may represent only the application binaries and data files.

The imaged data may be restored at any time to recreate the safe testing environment. These examples illustrate the remote, programmatic, automated control of the testing environment (e.g., no manual intervention required). In this manner, hundreds of computing devices may reliably and robustly run hundreds of test cases in parallel, all controlled by an embodiment running on a central computing device.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an" "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of imaging at least one memory area of a computer-readable medium associated with a computing device, said computing device having a first operating system associated therewith, said memory area comprising one or more volumes, said method comprising:
    booting the computing device into a second operating system that is not associated with the first operating system, wherein the memory area associated with the computing device is offline when the computing device is booted into the second operating system;
    identifying at least one of the volumes of the memory area associated with the computing device, said identified volume spanning one or more partitions, each partition having logical files stored thereon, wherein at least one of said logical files is inaccessible for imaging unless the memory area is offline; and
    for each of the partitions of the identified volume:
        receiving, from a user, a selection of one or more of the logical files stored on the partition;
        copying the selected logical files to an image file, said image file being configured for containing one or more images, wherein the selected logical files are copied to an image in the image file;
        determining volume information for the partition;
        determining partition information for the partition; and
        storing each of the determined volume information and the determined partition information as a separate image in the image file for reconstructing the partition.

2. The method of claim 1, wherein the one or more of the logical files associated with each of the partitions of the identified volume are also associated with the first operating system.

3. The method of claim 2, wherein copying the selected logical files to the image comprises copying the selected logical files associated with the partition including the logical files associated with the first operating system.

4. The method of claim 1, wherein the received selection represents a subset of the copied logical files stored in the image file and further comprising:
    accessing the image file;
    identifying one or more images in the image file associated with the received selection of logical files, said identifying further comprising identifying the partition associated with each of said identified one or more images;
    obtaining, via the identified one or more images, for each of the identified partitions:
        the volume information for the partition; and
        the partition information for the partition;
    re-partitioning the memory area associated with the computing device based on the obtained volume information and the obtained partition information; and
    extracting only the logical files associated with each of the identified partitions from the image file to the memory area to restore the identified volumes.

5. The method of claim 4, wherein each of the logical files comprises one or more segments, and wherein extracting the logical files associated with each of the identified partitions to the memory area to restore the identified volumes comprises writing the segments of each of the logical files to contiguous sectors on the memory area, wherein allocating of the contiguous sectors of the memory area is done during said extracting and said writing of the logical files.

6. The method of claim 1, wherein the partition information comprises one or more of the following: partition type, partition size, partition offset, hidden status, active status, and boot sector information.

7. The method of claim 1, wherein the volume information includes one or more of the following: volume identifier, drive letter, label, file system, volume type, volume size, and volume status.

8. The method of claim 1, wherein one or more computer-readable storage media have computer-executable instructions for performing the method recited in claim 1.

9. A system comprising:
a memory area for storing volume information, partition information, and logical files associated with a disk of a computing device, said disk being associated with a first operating system, said first operating system locking at least one of the logical files associated with the disk when executing, wherein only the first operating system may access the locked logical file; and
a processor configured to execute computer-executable components comprising:
a backup component for:
booting the computing device into a second operating system, wherein the first operating system is no longer executing, wherein the second operating system has access to the disk of the computing device in an offline mode, and wherein the second operating system does not lock any of the logical files associated with the disk while in the offline mode;
identifying at least one volume of the disk, said volume spanning one or more partitions, each of said partitions having one or more files stored thereon; and
for each of the partitions:
selecting of one or more logical files from the one or more files stored on the partition;
copying the logical files associated with the partition from the memory area to an image file, said image file being configured for containing one or more images, wherein each of the copied logical files is copied to a separate image in the image file and includes one or more logical files locked by the first operating system when executing and the copied logical files exclude page files;
obtaining the volume information for the partition from the memory area;
obtaining the partition information for the partition from the memory area; and
storing each of the obtained volume information and the obtained partition information as an additional logical file in the image file; and
a restore component for:
accessing the image file as an offline data file;
identifying the at least one volume from the stored volume information of the additional logical file;
identifying the partitions associated with the identified volume from the stored partition information of the additional logical file;
for each of the identified partitions, obtaining the volume information for the partition and obtaining the partition information for the partition from the additional logical file;
re-partitioning the disk associated with the computing device based on the volume information and the partition information obtained from the additional logical file; and
extracting logical files corresponding to the selected logical files to the disk to restore the corresponding identified volume.

10. The system of claim 9, wherein each of the logical files comprises one or more segments, and wherein the processor is further configured to execute computer-executable components for writing the segments of each of the logical files to contiguous sectors on the disk, wherein allocating of the contiguous sectors of the disk is done prior to said writing of the logical files.

11. A method comprising:
associating a first operating system with a computing device, said first operating system, when executing, locking at least a portion of data associated with a disk associated with the computing device, wherein only the first operating system may access the locked portion of data;
configuring the computing device to boot into a second operating system on a remote network device and to execute a capture script via a PXE protocol, said computing device being operatively connected to a programmatically remote controllable power source, wherein the second operating system has access to the disk of the computing device in an offline mode when the first operating system is no longer executing, wherein the second operating system does not lock at least a portion of data associated with the disk in the offline mode, wherein the disk is offline when the computing device is booted into the second operating system; and
communicating with the programmatically remote controllable power source to reboot the computing device into the second operating system, wherein the second operating system executes the capture script to:
store the contents of one or more volumes of a first memory area of the disk to a second memory area of the disk as one or more images, an image file on the second memory area being configured for containing the one or more images, wherein each image comprises a subset of files stored on a partition, wherein each of the one or more volumes comprises one or more of said partitions, wherein the contents comprise data associated with the first operating system including the portion of the data locked by the first operating system when executing;
obtain the volume information for the one or more volumes of a first memory area from the first memory area;
store the obtained volume information to the second memory area as an additional image in the image file;
configure a remote boot controller to enable the computing device to boot into the first operating system upon the next reboot; and
reboot the computing device into the first operating system.

12. The method of claim 11, further comprising:
configuring the computing device to boot into the second operating system and to execute an apply script; and
communicating with the programmatically remote controllable power source to reboot the computing device into the second operating system, wherein the second operating system executes the apply script to:
access the image file as an offline data file;
re-format the first memory area based on the stored volume information;
apply the contents of the image file stored in the second memory area to the first memory area;

configure the computing device to reboot into the first operating system; and reboot the computing device into the first operating system.

13. The method of claim 11, further comprising receiving a selection of volumes from the user, and wherein the second operating system executes the capture script to store the contents of the selected volumes of the first memory area to the image file on the second memory area.

14. The method of claim 11, wherein said associating, said configuring, and said communicating occur without human intervention local to the computing device.

15. The method of claim 11, wherein one or more computer-readable storage media have computer-executable instructions for performing the method recited in claim 11.

* * * * *

UNITED STATES PATENT AND TRADEMARK OFFICE
CERTIFICATE OF CORRECTION

PATENT NO.       : 7,669,021 B2                                       Page 1 of 1
APPLICATION NO. : 11/358327
DATED            : February 23, 2010
INVENTOR(S)      : Cheng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 449 days.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,669,021 B2 | Page 1 of 1 |
| APPLICATION NO. | : 11/358327 | |
| DATED | : February 23, 2010 | |
| INVENTOR(S) | : Haichen Cheng et al. | |

It is certified that error appears in the above-identified patent and that said Letters Patent is hereby corrected as shown below:

In column 10, line 39, in Claim 3, after "image" insert -- file --.

Signed and Sealed this

Fifteenth Day of February, 2011

David J. Kappos
*Director of the United States Patent and Trademark Office*